United States Patent [19]

Lackey

[11] Patent Number: 5,453,901
[45] Date of Patent: Sep. 26, 1995

[54] DETECTION AND PROTECTION OF EXCITATION SYSTEM FROM DIODE FAILURE

[75] Inventor: Dale F. Lackey, Saratoga, N.Y.

[73] Assignee: General Electric Co., Schenectady, N.Y.

[21] Appl. No.: 401,669

[22] Filed: Mar. 9, 1995

Related U.S. Application Data

[63] Continuation of Ser. No. 134,657, Oct. 12, 1993, abandoned.

[51] Int. Cl.⁶ ........................................................ H02H 7/06
[52] U.S. Cl. .............................. 361/21; 363/53; 363/102; 361/86; 322/59; 322/61
[58] Field of Search ...................... 363/53, 78, 84, 363/81, 102, 104, 106, 107, 108; 361/20, 21, 31, 54, 55, 57, 63, 86, 91, 115; 322/28, 59, 69

[56] References Cited

U.S. PATENT DOCUMENTS

| | | |
|---|---|---|
| 3,955,121 | 5/1976 | Vahey . |
| 4,041,543 | 8/1977 | Pasculle et al. ........................... 361/33 |
| 4,080,559 | 3/1978 | Wright et al. ............................. 322/58 |
| 4,164,705 | 8/1979 | Whitney et al. ................ 324/158 MG |
| 4,208,687 | 6/1980 | Sun et al. .................................. 361/20 |
| 4,336,486 | 6/1982 | Gorden et al. ............................ 322/63 |
| 4,442,396 | 4/1984 | Hucker ...................................... 322/21 |
| 4,486,801 | 12/1984 | Jackovich et al. ........................ 361/21 |
| 4,695,939 | 9/1987 | Canay ........................................ 363/39 |
| 4,704,569 | 11/1987 | Mallick, Jr. et al. .................... 318/718 |
| 4,764,838 | 8/1988 | MacFarlane .............................. 361/21 |
| 4,772,802 | 9/1988 | Glennon et al. .......................... 290/31 |
| 4,910,421 | 3/1990 | VanSchaick et al. ................. 310/68 D |

*Primary Examiner*—Peter S. Wong
*Assistant Examiner*—Adolf Berhane
*Attorney, Agent, or Firm*—Nixon & Vanderhye

[57] ABSTRACT

Loss of excitation and control and subsequent damage to exciter windings in an excitation system for dynamoelectric machines wherein one or more rotating diodes fail in a shorted mode is prevented through the use of an RC circuit for detecting AC voltages in an exciter field winding for the purpose of directly operating a circuit breaker to remove excitation to the field windings and supply or to activate a timer for such purposes while temporarily shorting the AC current through the exciter field winding.

8 Claims, 3 Drawing Sheets

5,453,901

DETECTION AND PROTECTION OF EXCITATION SYSTEM FROM DIODE FAILURE

This is a continuation of of application Ser. No. 08/134,657 filed on Oct. 12, 1993 now abandoned.

FIELD OF THE INVENTION

The invention relates to rotating rectifier exciters for dynamoelectric machines and more specifically to the detection of diode failure and the prevention of subsequent damage to the exciter windings and voltage regulator.

BACKGROUND AND SUMMARY OF THE INVENTION

FIG. 1 is illustrative of prior art power generator excitation systems wherein the power source 1 may be internal to the power generator and consists of an exciter on the same shaft as the generator which includes an auxiliary three phase winding wherein power for the winding may be derived from the air gap flux of the generator. The potential for the winding is conventionally stepped down through the use of a power potential transformer 2 in order to meet low voltage generator field requirements. The transformer output is fed to a three phase rectifier bridge 3 to furnish the required DC power to the generator field winding 5 by way of standard regulation circuits 4 for regulating exciter field voltage and the generator terminal voltage.

In recent years rotating rectifier exciter systems have become popular and conventionally include AC generators with a rotating fused diode assembly along with a static voltage regulator for excitation control wherein the diodes are mounted on a wheel assembly attached to an extension of the generator shaft. In a conventional manner such excitation circuits for power generators are used to provide DC power to the field windings of the generator by rectifying the alternating current output of an exciter rotor. However, failure of a single diode in a shorted mode can result in significant hazardous conditions to system operation due to high voltages in the exciter field, high currents in the exciter armature and loss of excitation and control. Thus, rapid response of a detection and protection system is required in order to prevent subsequent damage to the exciter windings and the voltage regulator.

Conventional protective schemes currently in use require the rectifier to have redundant diodes in parallel along with fuses in series with each such diode. Alternatively, two diodes connected in series to carry the load current subsequent to a shorted diode failure of one of the diodes have been used. Moreover, doubling and quadrupling of such critical system components have also been proposed for redundant protection. However, doubling and quadrupling of such components clearly increases the probability of failure of one or more components as well as adding to product costs, increased losses, as well as increased ventilation requirements for cooling such components.

More recent applications have utilized bore pack rectifier assemblies where the rectifiers are mounted inside the generator shaft. Although such construction has been shown to reduce losses and increase reliability, such assemblies conventionally have no redundant diodes or fuses for protection in the event of a diode short. Accordingly, there is a continuing concern over the absence of a diode short detection and protection system, notwithstanding the expected high mean time between failures in such bore pack rectifier assemblies. In this regard, simulation tests at minimum excitation levels were conducted wherein the excitation system included a shorted diode. Such tests indicated that high currents in the armature are produced which resulted in an unbalanced rotating magnetic field which generated high alternating voltage in the exciter field windings. The high alternating voltage in turn was rectified into DC resulting in self excitation and loss of control.

I have discovered relatively simple detection and protection systems designed to be applied by direct attachment to the field leads of the exciter for detecting the AC voltage in the field windings due to the presence of a shorted diode in the excitation system. Such detection may thereafter be used for removal of all excitation from the generator field, as well as the field supply, and thus eliminate further damage to the excitation system. Moreover, since the protective systems proposed herein may be directly attached to the field leads of the exciter, they are suitable for direct application to existing generators equipped with DC field exciters, as well as bore pack or diode wheel rectifiers.

Moreover, the objects and advantages of my invention will be more completely understood and appreciated by the artisan carefully studying the following description of the presently preferred exemplary embodiments taken in conjunction with the accompanying drawings of which:

DETAILED DESCRIPTION OF THE DRAWINGS

Figure 1:
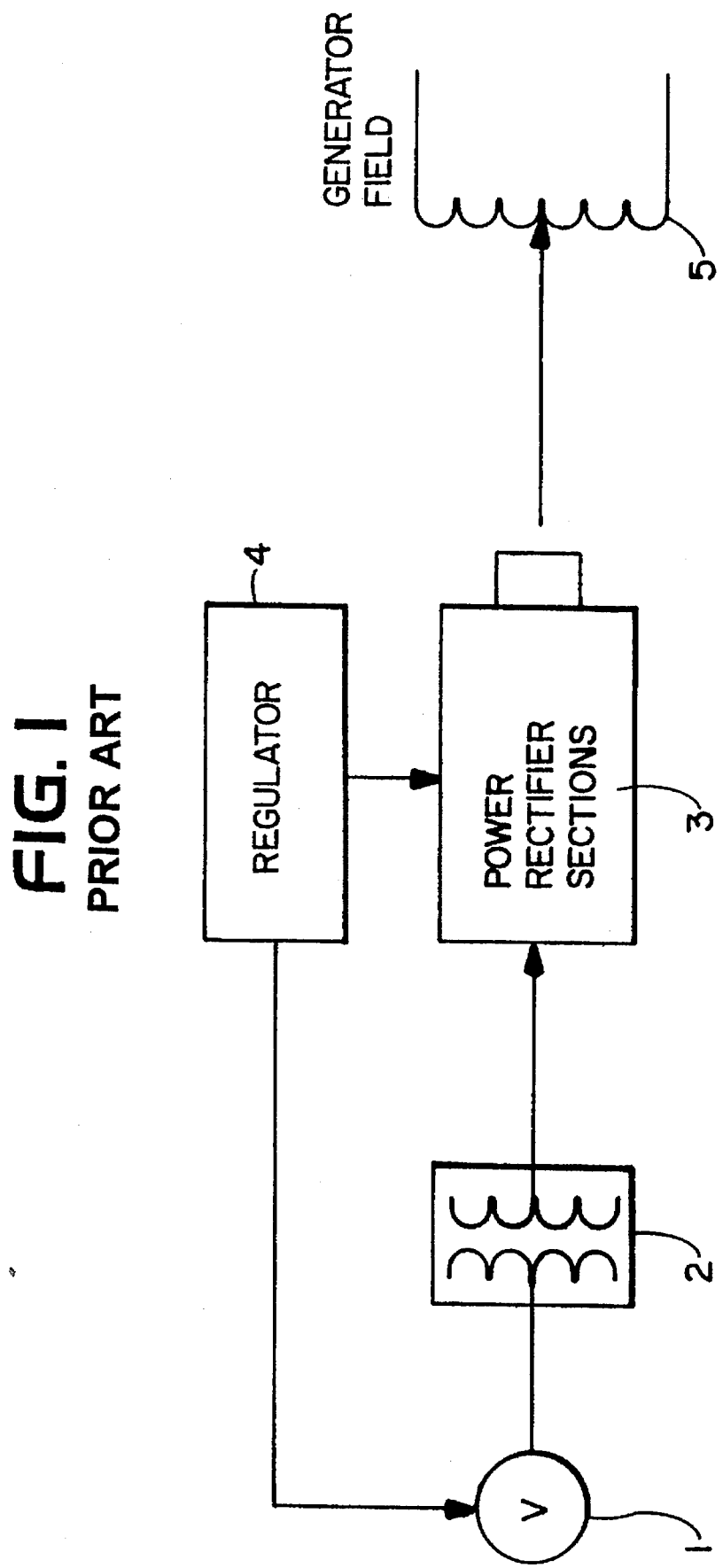
FIG. 1 illustrates the general configuration of a prior art generator excitation system.
Figure 2:
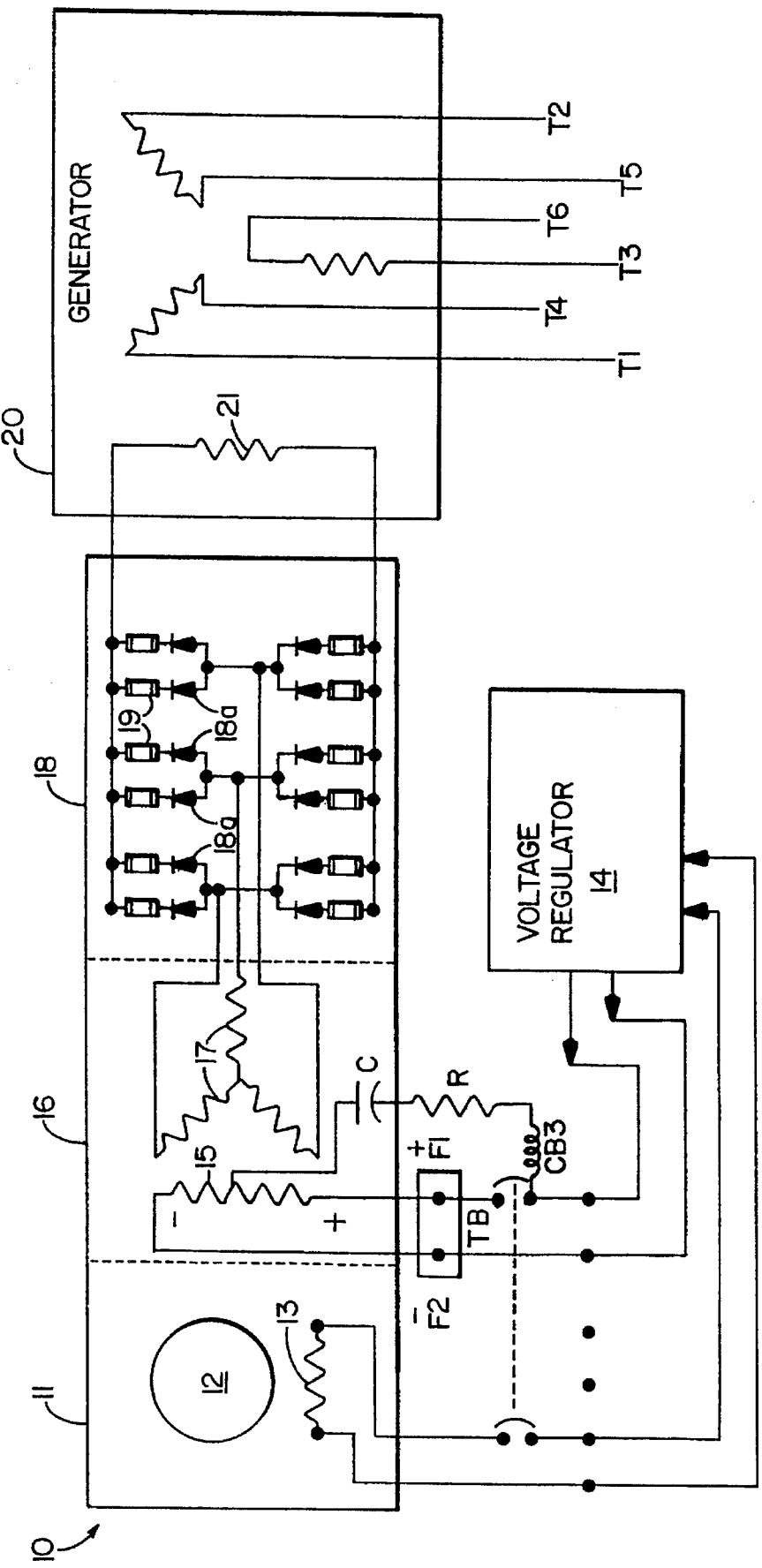
FIG. 2 illustrates a first embodiment of my shorted diode detection and excitation protection system.

FIG. 2 illustrates in schematic form an excitation system 10 for supplying DC power to the field winding 21 of a three phase AC generator 20. The excitation system includes a permanent magnet generator 11 comprising rotor 12 and stator 13 for supplying an input voltage to voltage regulator 14. Regulator 14 in turn supplies DC voltage of an appropriate level to exciter 16 by way of a two pole ground fault trip circuit breaker CB 3. As will be noted, the two poles of the circuit breaker when closed will permit normal operation of both the permanent magnet generator, as well as the voltage regulator, to thus supply DC voltage of an appropriate excitation level to the field windings 15 of the exciter 16.

Exciter 16 additionally includes three phase auxiliary windings 17 for supplying AC power to the three phase rectifier bridges 18 comprising redundant diodes 18a connected in parallel with each diode also including a fuse 19 connected in series. The output of the diode bridges in turn supplies DC power to the generator field winding 21.

Conventionally, the permanent magnet generator 11, exciter 16 and diode bridge are mounted on an extension of the shaft of generator 20 for rotation; whereas, voltage regulator 14 is static. As aforementioned, the diode bridge assemblies 18 may be redundant, as illustrated, and may be mounted to the generator shaft by way of a conventional wheel assembly. Alternatively, the diode bridge may be rotatable by way of the aforementioned bore pack assembly where the rectifiers are mounted inside the generator shaft but without the use of redundant diodes or fuses.

As will be noted, the circuit breaker CB 3 is connected and is responsive to any AC field winding voltage by way of a resistor-capacitor circuit path. During operation, the circuit breaker CB 3 is closed, thus permitting normal operation of the voltage regulator and the permanent magnet generator. Under such normal operating conditions, DC voltage is applied to the field winding 15 and normal exciter DC field current flows through the winding with the capacitor C blocking DC current flow through the resistor and ground fault detector. In this regard, although a slight harmonic AC current may be present, judicious selection of the resistor and capacitor will prevent false tripping conditions. Moreover, the size of the resistor which may be fixed or variable is sized to control the trip point of the circuit breaker.

Diode fault conditions creating short circuit currents in the exciter rotor armature will in turn generate AC voltages in the exciter field. Capacitor C will, however, readily permit the AC current to flow through the resistor R and the circuit breaker to thus operate the circuit breaker to its open position when the AC current exceeds 0.005 amperes, for example. As a result, the poles of the circuit breaker CB 3 will open both the regulator supply to the field winding, as well as the permanent magnet generator input to the voltage regulator, thus removing all excitation to the exciter field and field supply.

Figure 3:
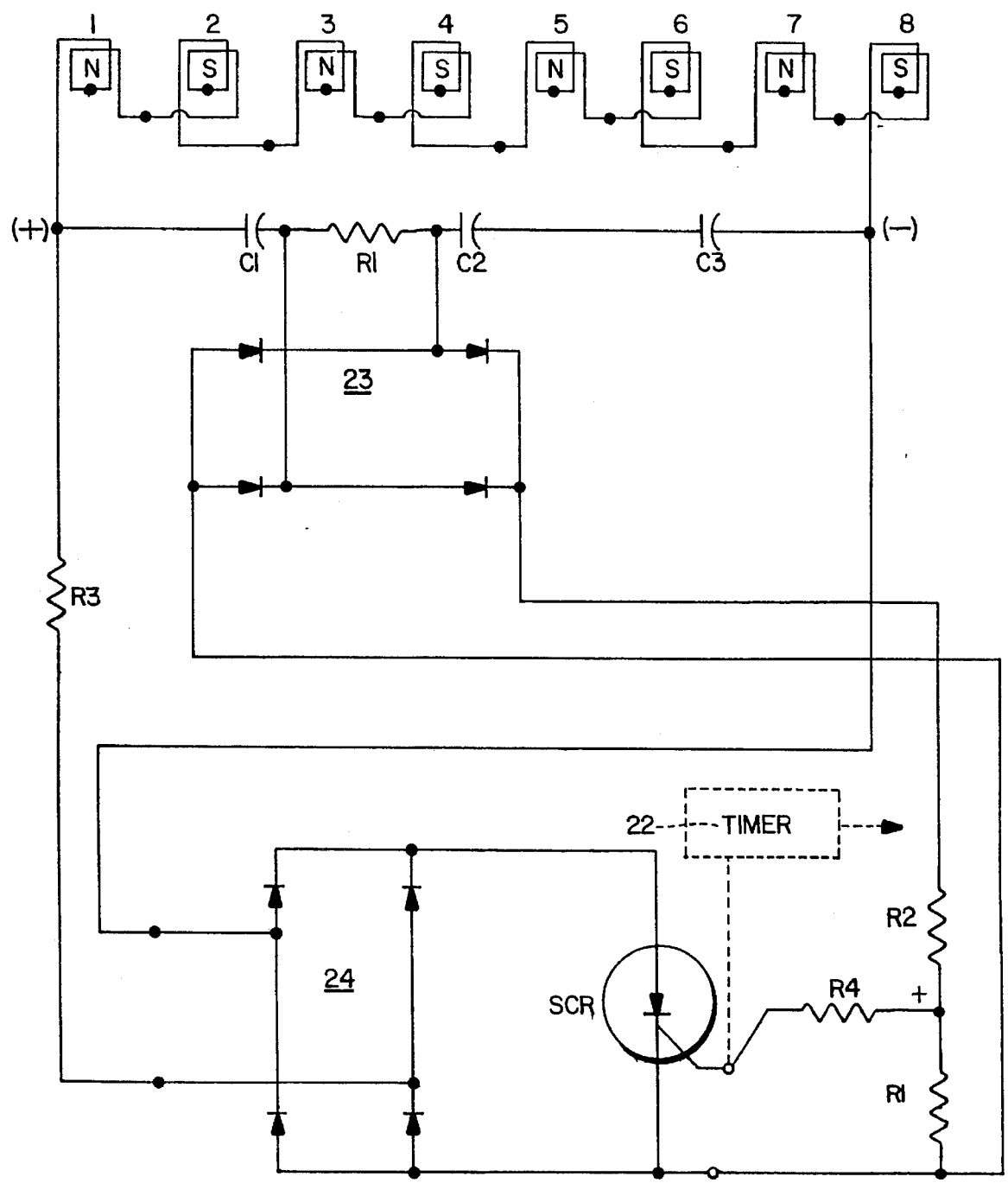
FIG. 3 illustrates a second exemplary embodiment for the protection of the excitation system in the presence of a shorted diode.

A second exemplary embodiment of a protection system is illustrated in FIG. 3 which show a solid state electronic module for detecting the presence of alternating voltage in an exemplary 8 pole field winding 15. The illustrated embodiment upon detecting alternating voltage in the field winding triggers a control signal for the purpose of shorting the alternating voltage and current through the field winding. Such an operation restricts the voltage to a very low value for a short period of time, such as a few seconds, until a preset timer circuit 22, which may be included in the existing regulator controls, removes the excitation.

Operation of the module illustrated in FIG. 3 is somewhat similar to that which is illustrated in FIG. 2 in that any AC voltage generated in the field winding 15 due to a shorted exciter diode is passed by capacitors C1 through C3 connected across the exciter field. Under such conditions, the resistor R1 connected in series with the capacitors will provide a small AC voltage which is rectified by diode bridge 23 to supply a DC control voltage to the SCR. This control voltage is adjusted to limit the gate current and voltage by way of the voltage divider formed by resistors R1, R2 and R4.

With the SCR gated "ON", the AC voltage generated due to the rotating diode fault is through resistor R3, the SCR diode bridge 24, the SCR and the field winding. In this regard, the resistor R3 is of relatively low resistance but high wattage in order to prevent direct shorting of the DC field when the SCR is initially turned "ON". Nevertheless, a large portion of the energy produced as a consequence of the shorted diode is absorbed in the relatively massive field winding.

That is to say, the field winding is capable of absorbing such energy without overheating for a relatively brief period of time such as the few seconds required by the timer circuit 22 to remove the excitation. As will be appreciated by the artisan, response time of the proposed system to short the field may be very short, such as about 0.004 seconds. Moreover, it is contemplated that the timer circuit may be adjustable from two to about twenty seconds after detection of a shorted diode depending upon the energy absorbing capacity of the particular field winding in question. As an additional consideration, it may be necessary to include a time delay or filter in the circuit to prevent false tripping of the SCR.

Thus, it may be seen that with the circuitry constructed in the manner illustrated in FIGS. 2 or 3, the high voltages and currents produced in the exciter field due to shorted diodes in the power rectification portion of the exciter system, which leads to loss of excitation and control and subsequent damage to the exciter windings and the voltage regulator, may be avoided by the herein disclosed detection and protection circuitry. As will be appreciated by the artisan, numerous variations and advantages may be obtained by the disclosed circuitry, such as the actuation of remote signalling or alarms for warning of a diode failure in addition to safely shutting down the regulator and generator equipment. Moreover, the noted circuitry is advantageously designed so as to be capable of direct attachment to the field leads of the exciter and is, therefore, suitable for direct application to existing motors or generators equipped with DC field exciters, as well as bore pack or diode wheel rectifiers.

In the application of the exemplary embodiments to a new unit, it is believed to be preferable to utilize a single pair of poles to detect the AC voltage by providing a pair of pole leads. Under such circumstances, the signal voltage is reduced and the need for series capacitors is eliminated. A still further option is that of providing a special instrument coil on a pole in order to detect a signal. It is believed, however, that one advantage of utilizing all or part of the field winding for such purposes is that the source of the generated voltage provides the signal directly to the detection and protection circuit. Additionally, it will be appreciated that shunt trip circuit breakers and auxiliary relays may be applied with either of the above noted embodiments in order to shut down and activate an alarm or signal a diode failure to a remote location.

While the invention has been described in connection with what is presently considered to be the most practical and preferred embodiments, it is to be understood that the invention is not to be limited to the disclosed embodiments, but on the contrary is intended to cover the various modifications and equivalent arrangements included within the spirit and scope of the appended claims.

What is claimed is:

1. An excitation system for supplying DC excitation power to dynamoelectric machines, said excitation system comprising:

an exciter including a field winding and auxiliary windings for producing polyphase voltages;

a plurality of rectifier sections, said sections being connected to the auxiliary windings of the exciter and to the dynamoelectric machine so as to convert said polyphase voltages to a DC excitation voltage for supply to said machine;

a power supply including a source of DC voltage and a voltage regulator connected to said source for supplying a DC voltage of a selectable level to said field winding, said DC voltage being connected to the exciter field winding by way of a circuit breaker switch; and means for detecting an AC fault voltage in said field winding of the exciter for activating said circuit breaker switch to disconnect the power supply from the regulator and the regulator from the field winding, said means for detecting including a series connected resistor-capacitor circuit connected between said field winding and said circuit breaker switch for passing AC fault current to cause said circuit breaker switch to operate.

2. An excitation system as in claim 1 wherein said exciter is a three phase alternator and said rectifier sections include three phase rotating diode bridges.

3. An excitation system as in claim 2 wherein said fault voltage is produced by one or more shorted diodes in said three phase diode bridge.

4. An excitation system as in claim 1 wherein said circuit breaker switch is a two pole ground fault trip circuit breaker for disconnecting said source from said regulator and the regulator from said field winding.

5. An excitation system as in claim 1 wherein the resistor is sized so as to control the trip point of the circuit breaker switch.

6. An excitation system as in claim 1 wherein the means for detecting includes means for activating a timer in response to the detection of AC fault voltage and wherein the circuit breaker switch disconnects the power supply from the field winding after a selectable time period in response to said timer.

7. An excitation system as in claim 6 wherein said detected AC fault voltage is shorted through an energy absorption circuit including said field winding until the circuit breaker disconnects the power supply from the field winding.

8. An excitation system as in claim 7 wherein said means for activating includes said resistor-capacitor circuit for producing a control signal indicative of the presence of said AC fault voltage in said field winding and a silicone controlled rectifier responsive to the control signal for activating said energy absorption circuit.

* * * * *